(12) United States Patent
Penugonda et al.

(10) Patent No.: US 7,672,452 B2
(45) Date of Patent: Mar. 2, 2010

(54) SECURE SCAN

(75) Inventors: Madhusudhan R. Penugonda, San Diego, CA (US); Michael W. Johnson, Escondido, CA (US); Eric J. Sprunk, Carlsbad, CA (US); An Tonthat, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1855 days.

(21) Appl. No.: 10/428,882

(22) Filed: May 1, 2003

(65) Prior Publication Data

US 2003/0206627 A1    Nov. 6, 2003

Related U.S. Application Data

(60) Provisional application No. 60/377,551, filed on May 3, 2002.

(51) Int. Cl.
*H04K 1/00* (2006.01)
(52) U.S. Cl. .................. 380/2; 726/2; 714/726
(58) Field of Classification Search ......... 713/1, 713/2, 188, 194; 380/200, 201, 255, 277, 380/2, 23; 726/2; 714/724, 726, 727, 7
See application file for complete search history.

(56) References Cited

U.S. PATENT DOCUMENTS

| | | | |
|---|---|---|---|
| 3,621,387 A | 11/1971 | Smith et al. | |
| 3,673,397 A | 6/1972 | Schaefer | |
| 3,812,426 A | 5/1974 | Illian | |
| 4,000,460 A | 12/1976 | Kadakia et al. | |
| 4,907,275 A * | 3/1990 | Hashimoto | 713/161 |
| 5,357,572 A * | 10/1994 | Bianco et al. | 713/193 |
| 5,386,471 A * | 1/1995 | Bianco | 713/162 |
| 5,517,637 A * | 5/1996 | Bruce et al. | 703/15 |
| 5,606,568 A | 2/1997 | Sudweeks | |
| 5,651,068 A | 7/1997 | Klemba et al. | |
| 5,689,565 A | 11/1997 | Spies et al. | |
| 5,999,959 A * | 12/1999 | Weng et al. | 708/492 |
| 6,058,492 A * | 5/2000 | Sample et al. | 714/33 |
| 6,073,261 A | 6/2000 | Miller | |
| 6,085,336 A * | 7/2000 | Swoboda et al. | 714/30 |
| 6,167,521 A * | 12/2000 | Smith et al. | 726/21 |
| 6,209,114 B1 * | 3/2001 | Wolf et al. | 714/784 |
| 6,295,604 B1 | 9/2001 | Callum | |
| 6,316,959 B1 * | 11/2001 | Onodera | 326/46 |
| 6,430,718 B1 * | 8/2002 | Nayak | 714/727 |
| 6,496,028 B1 | 12/2002 | Manhaeve et al. | |
| 6,542,841 B1 | 4/2003 | Snyder | |
| 6,556,037 B2 * | 4/2003 | Shiraishi | 324/765 |
| 6,574,760 B1 | 6/2003 | Mydill | |

(Continued)

*Primary Examiner*—Kimyen Vu
*Assistant Examiner*—Joseph Pan
(74) *Attorney, Agent, or Firm*—Larry T. Cullen

(57) ABSTRACT

According to the invention, a circuit that is capable of automated scan testing is disclosed. Included in the circuit are a cryptographic engine, a digital circuit, an input pin, and an output pin. The cryptographic engine capable of performing at least one of encryption and decryption of one or more digital signals. The digital circuit includes combinatorial logic and a number of memory cells. The memory cells have scan inputs connected serially in a scan chain. The input pin and output pin are coupled to the scan chain. At least one of the input pin and the output pin carries at least some cipher text data of the scan chain.

22 Claims, 11 Drawing Sheets

U.S. PATENT DOCUMENTS 6,651,214 B1 * 11/2003 Weng et al. .................. 714/771
7,185,249 B2 * 2/2007 Tkacik et al. ................ 714/726
7,230,898 B1 * 6/2007 Yokota et al. ............ 369/53.21
2003/0154372 A1 * 8/2003 Barszcz ...................... 713/161
2003/0212830 A1 * 11/2003 Greenblat et al. ........... 709/251

* cited by examiner

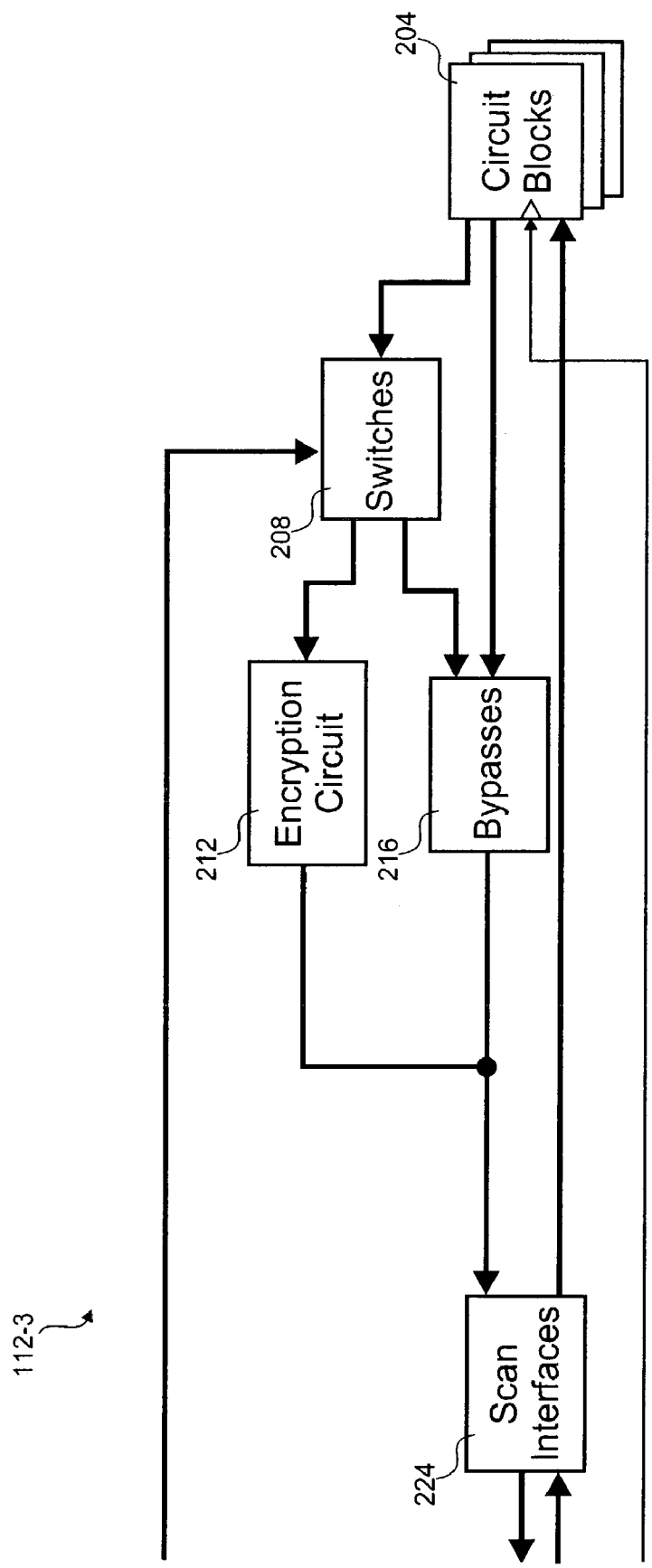

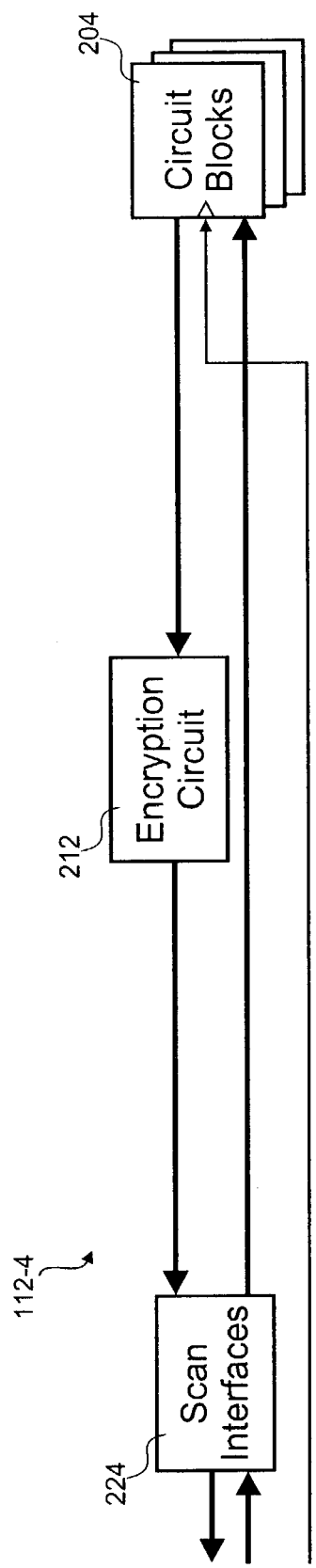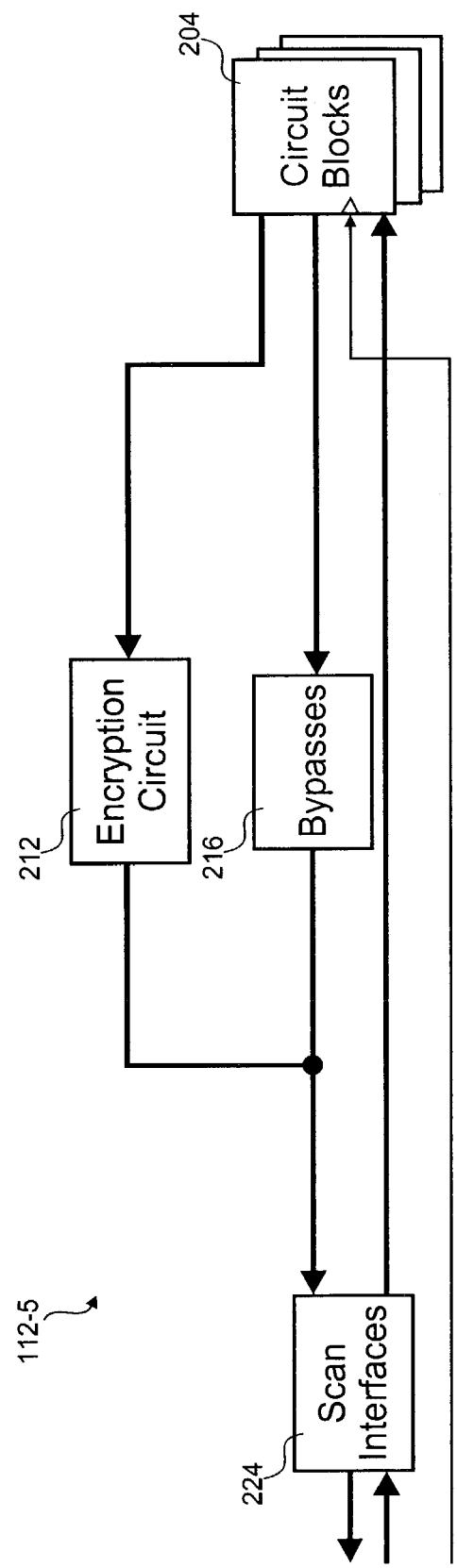

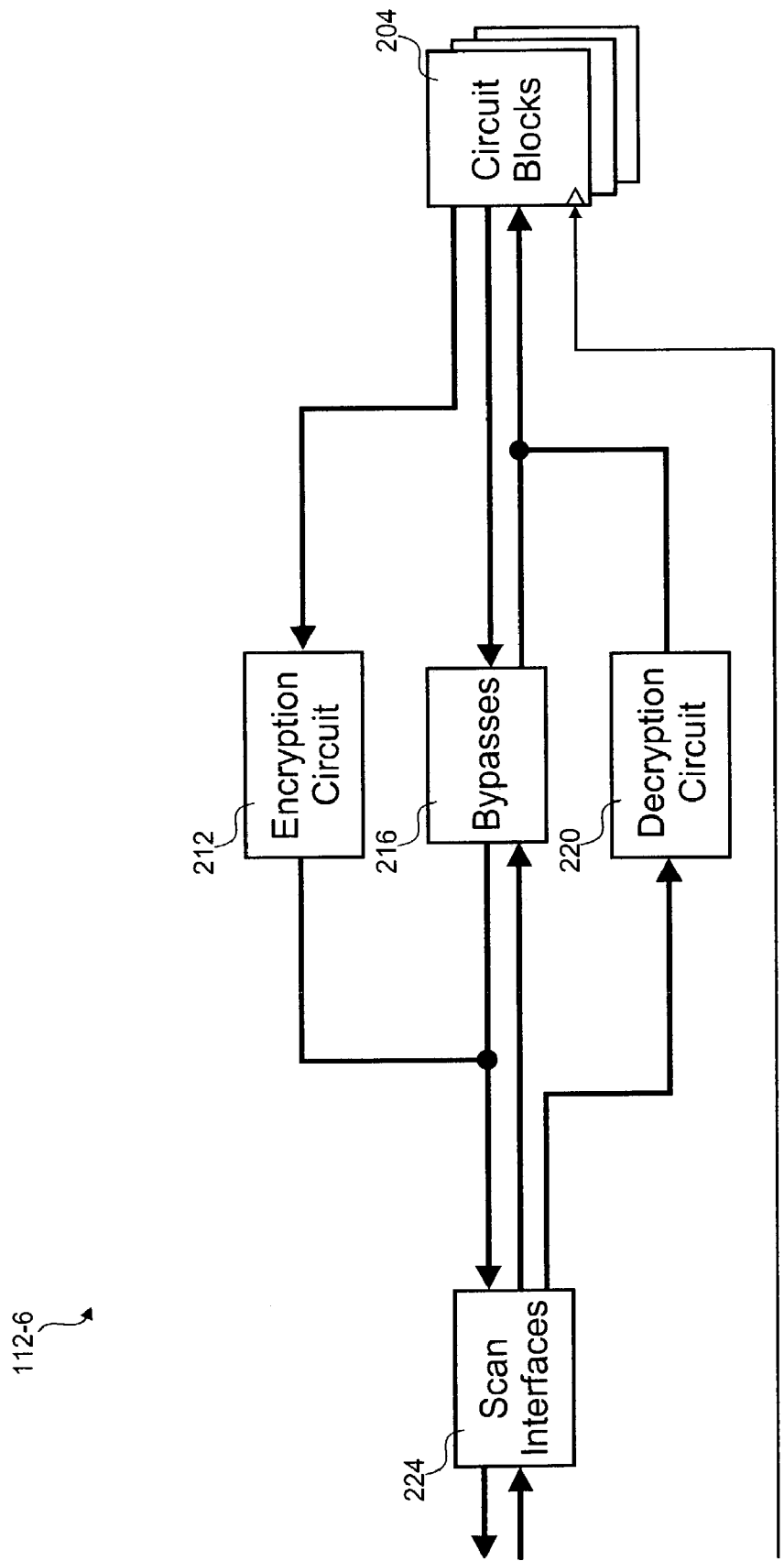

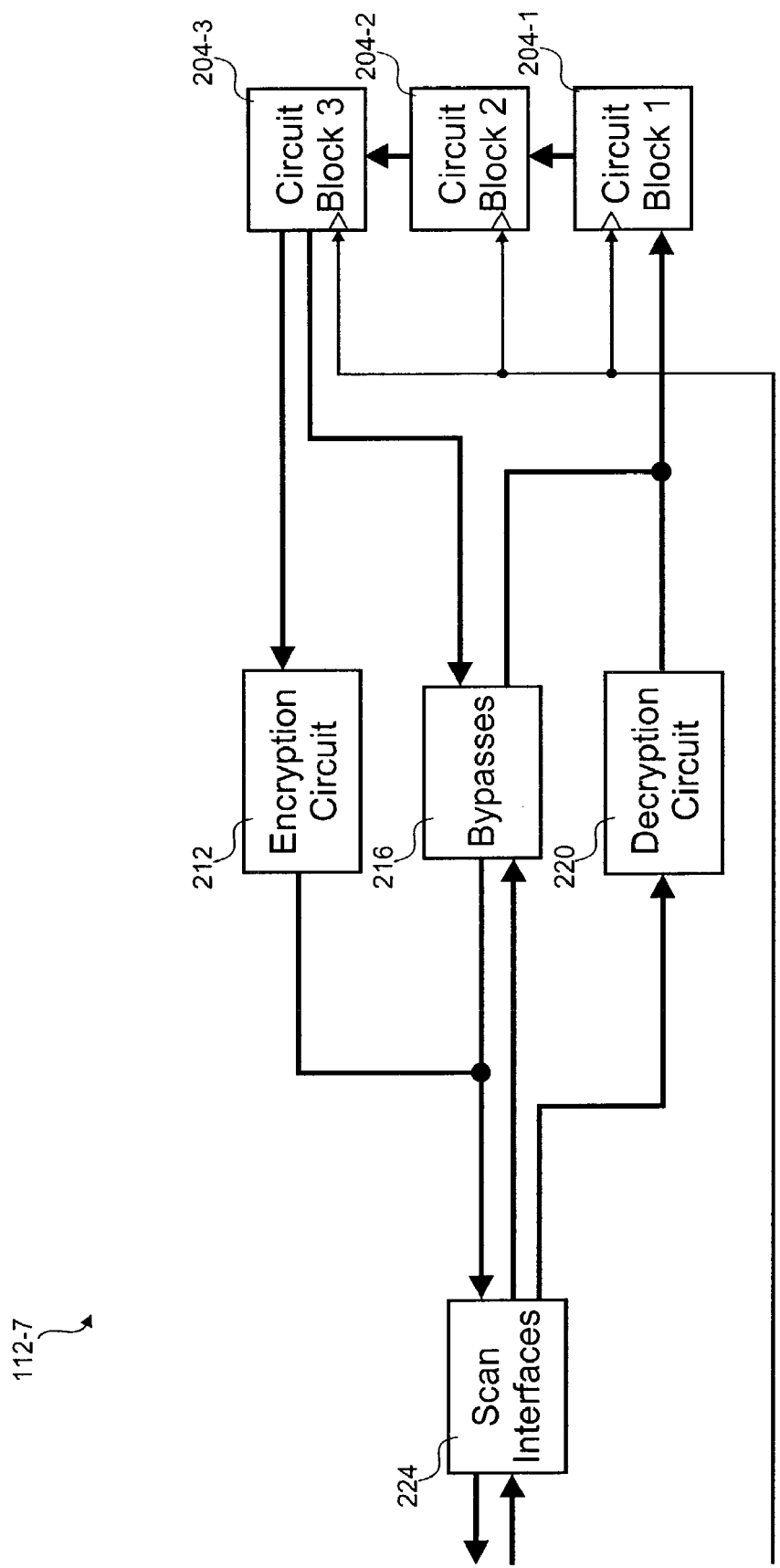

SECURE SCAN

This application claims the benefit of U.S. Provisional Application Ser. No. 60/377,551 filed on May 3, 2002, which is incorporated by reference in its entirety.

BACKGROUND OF THE INVENTION

This invention relates in general to electronic circuits and, more specifically, to automated testing of electronic circuits with scan chains.

Scan circuitry is used to test digital integrated circuits and circuit cards. Internal scan allows serially shifting an input scan signal into a scan chain of F/Fs of a digital integrated circuit to load them with an initial state. Once loaded, the integrated circuit can be clocked in the normal operational mode. Once normal operation stops, an output scan signal can be read out of the scan chain for analysis to confirm proper operation of the integrated circuit. Similarly, circuit card wiring can be tested using boundary scan techniques that test an integrated circuit input/output pins.

Testing of digital integrated circuits can be performed overseas and/or in test facilities with varying levels of security. Some organizations only allow the digital circuits they use to be tested domestically. Some feel the inputs and/or outputs to the internal or boundary scan chains could be used to gain information about the circuits that they test. Physical security measures are conventionally used to protect the test vectors from exploitation. For example, the test vectors and circuit testers that store them are available to a limited set of individuals. Physical security and screening is generally seen as being exploitable.

BRIEF DESCRIPTION OF THE DRAWINGS

The present invention is described in conjunction with the appended figures:

FIGS. 2A-H are block diagrams that each show an embodiment of a portion of a device under test (DUT);

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Figure 1:
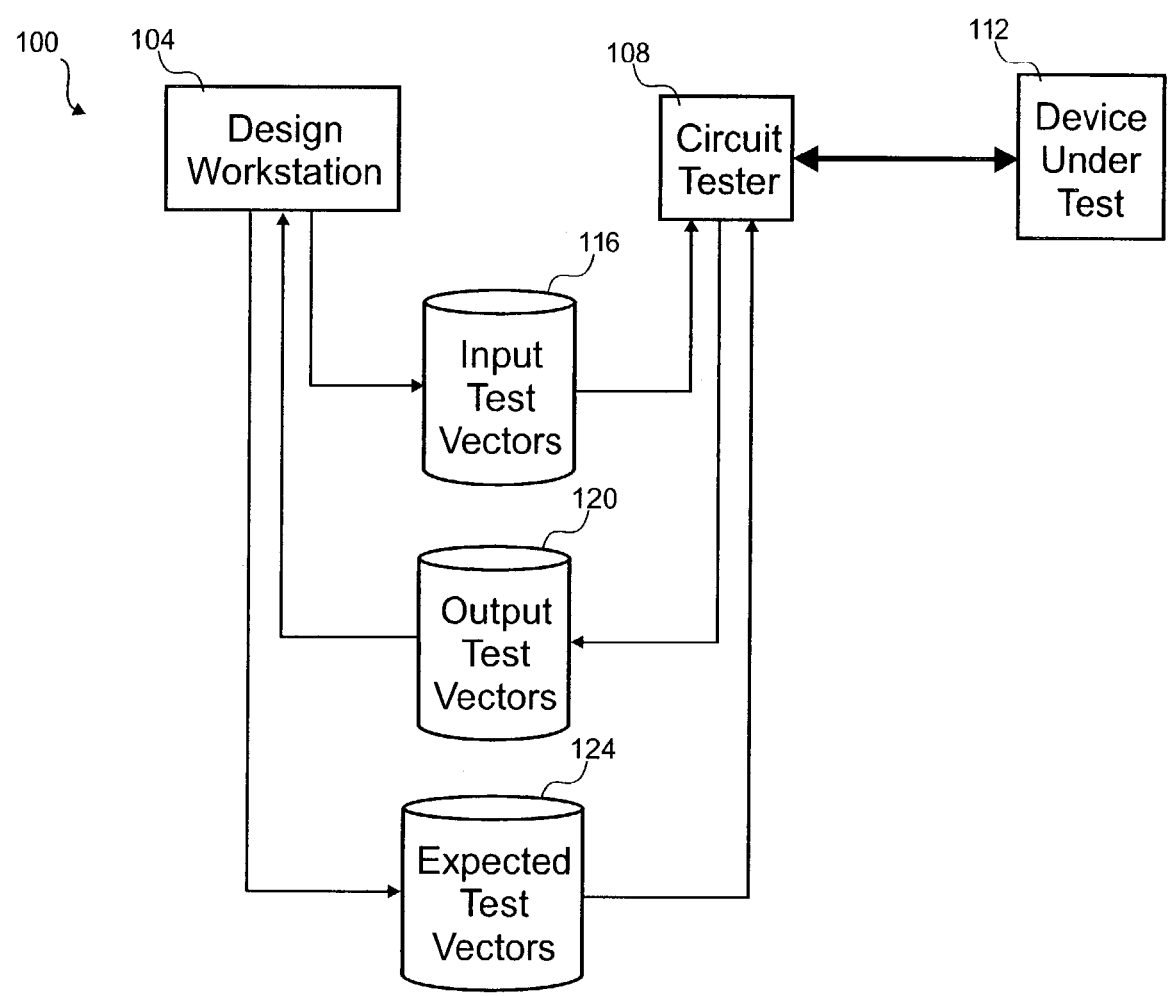
FIG. 1 is a block diagram of an embodiment of a circuit test system.

Referring first to FIG. 1, a block diagram of an embodiment of a circuit test system 100 is shown. The test system 100 is used to confirm the device under test (DUT) is functioning properly. This testing could be for debug of the DUT, production testing, etc. Included in the circuit test system 100 are a design workstation 104, a circuit tester 108, the DUT 112, input test vectors 116, and output test vectors. The DUT 112 is typically inserted into a DUT carrier that is part of the circuit tester 108. Automated systems may allow many DUT 112 to be loaded for serially testing each. The DUT 112 could be a bare die, a packaged integrated circuit (IC), a hybrid package of multiple ICs, a circuit card with one or more ICs, a module with one or more circuit cards, a system of modules, or any other configuration of circuits. The DUT 112 includes a cryptographic function capable of encryption, decryption and/or a hash function.

The circuit tester 108 applies signals to the DUT 112 and reads out other signals. Configuration information and the input test vectors 116 command the circuit tester 108 on how to stimulate the DUT 112. That stimulus causes the output signals of the DUT 112 to react. Those reactions are recorded by the circuit tester 108 and stored as output test vectors. The circuit tester 108 may also compare the output test vectors against a set of expected test vectors 124 such that a conclusion can be reached by the tester 108 on whether the DUT 112 is functioning properly.

The design workstation 104 may have many functions and is used to create the input test vectors 116 and the expected test vectors 124. In many cases, the design workstation 104 has a logical model of the DUT 112 that is used to produce test vectors. The logical model would be capable of encrypting the scan signal in the same way as the DUT such that an expected test vector could be generated in a deterministic way. Some embodiments, could encrypt the input test vectors 116 with the design workstation 104 using a public or private key. The DUT would decrypt those input test vectors 116 prior to loading them into the flip-flops (F/F) of the scan chain such that the input stimulus is deterministic.

The input test vectors 116 could be used to load seeds, DUT serial number, keys, and other initialization into the DUT 112. The input test vectors could be customized in part or wholly for each DUT 112 and could be in plain or cipher text form. For example, wholly or partially encrypted test vectors could be prepared for a particular DUT 112 which has a unique key stored in the DUT. A label on the DUT could be used that matches the DUT serial number loaded by the input test vectors 116.

Figure 2A:
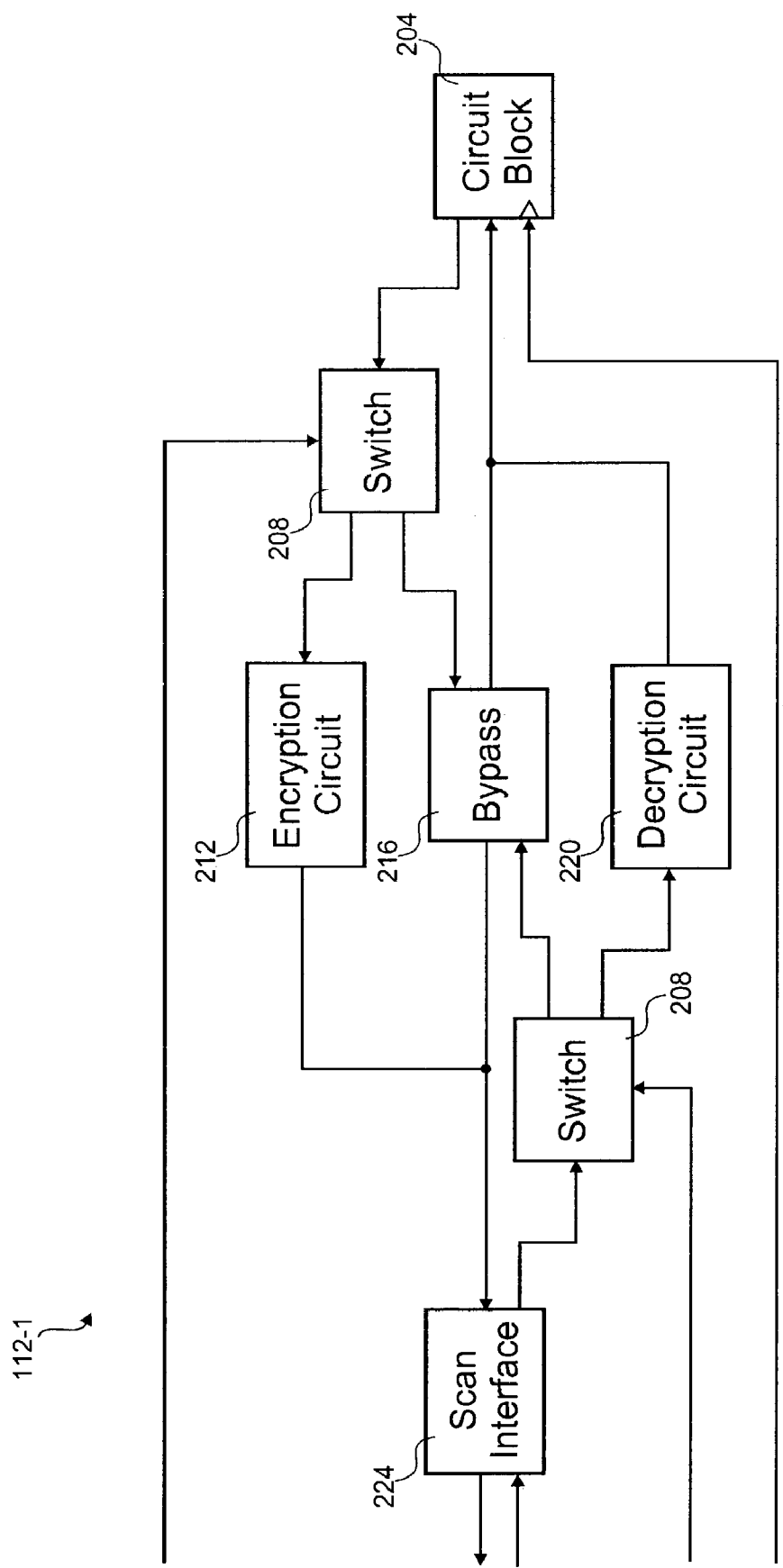

With reference to FIGS. 2A-H, block diagrams that each show an embodiment of a portion of a DUT 112 are depicted. The depicted portion may be all or a portion of the DUT. Referring first to FIG. 2A, a single internal scan chain DUT 112-1 is shown that can selectively-decrypt, selectively-encrypt and/or selectively-hash a scan signal. Included in the DUT 112-1 are a circuit block 204, a number of switches 208, an encryption circuit 212, a bypass circuit 216, a decryption circuit 220, and a scan interface 224. Some embodiments of the DUT 112 could include any number of separate scan chains even though this embodiment only includes a single scan chain.

The circuit block 204 is typically a combination of F/Fs or registers (i.e., a combination of memory cells) and combinatorial logic. The F/Fs and registers of the circuit block 204 are serially connected in an internal scan chain. The scan interface 224 receives a scan signal specified in the input test vectors 116. A first switch 208-1 is used to either couple the scan signal to the decryption circuit 220 or bypass 216 the decryption circuit. In this way, some of the scan signal may be decrypted and some may not. A bit in each input test vector can be used to selectively activate decryption with the first switch 208-1. In this embodiment, the decryption circuit uses serial decryption and encryption.

Once the scan signal is in completely plain text form, it is fed into the circuit block 204. The registers and F/Fs of the circuit block 204 are loaded in serial fashion with these initial values. A CAPTURE signal is activated to clock the circuit block 204 in normal operation. Once normal operation ends and the CAPTURE signal is deactivated, the scan chain in the circuit block 204 is unloaded in a serial fashion. A second switch 208-2 is used to selectively encrypt or hash the output scan signal by alternatively using the encryption circuit 212 or the bypass 216. The output scan signal, which may be partially or wholly encrypted/hashed, is passed out the scan interface 224 to register as part of an output test vector 120. Using a hash output allows verifying the circuit block 204 is likely functioning properly even thought the one-way nature of a hash function does not allow retrieving the plain-text version of the output scan signal.

Figure 2B:
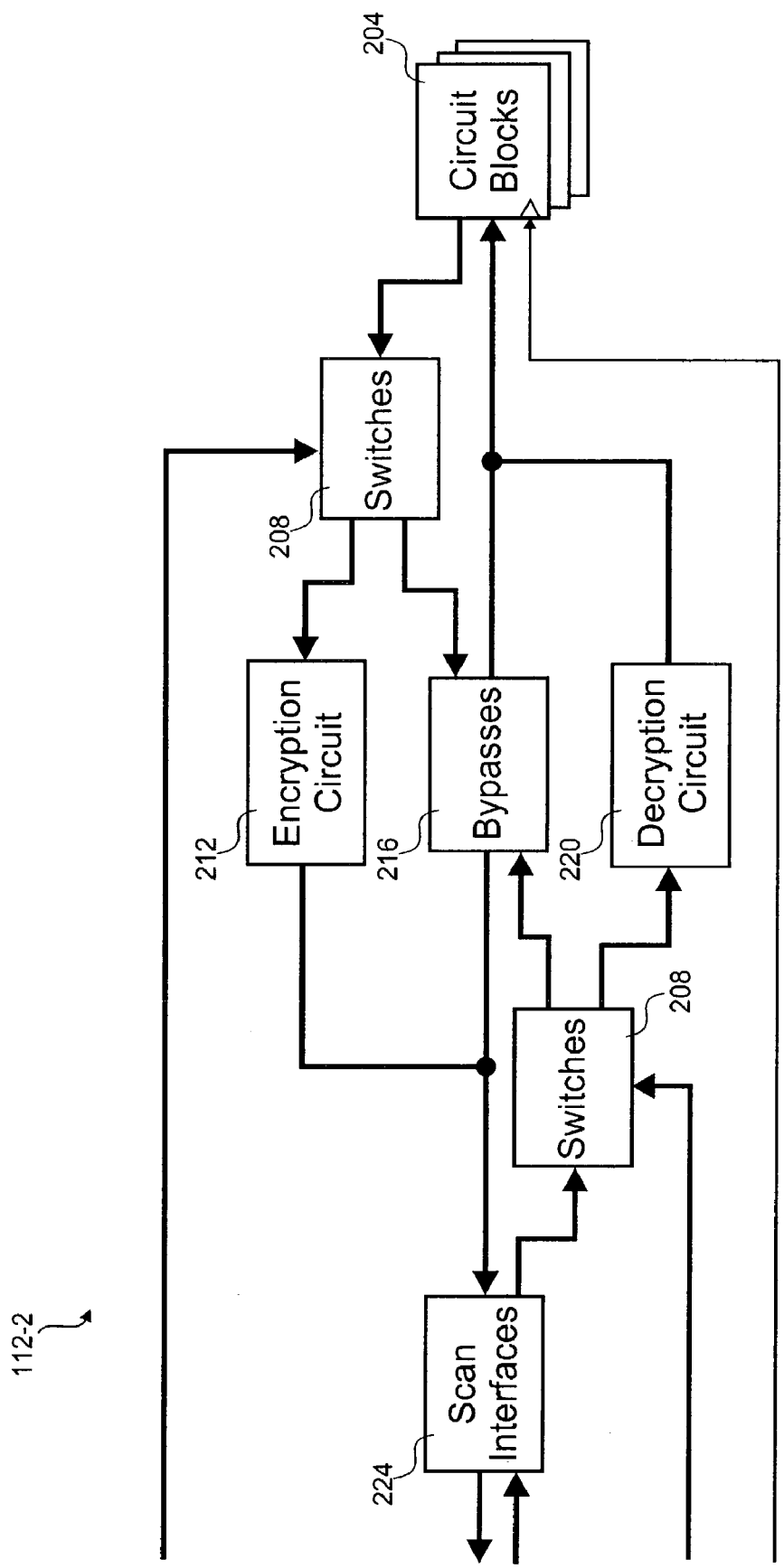

With reference to FIG. 2B, another embodiment of the DUT 112-2 is shown. This embodiment includes a number of scan chains for a number of circuit blocks 204. There are a number of input scan signals that are driven by the input test vectors 116 in parallel fashion. The first switch 208 can individually turn off or on decryption for each scan signal. The decryption circuit 220 could decrypt each signal with a serial algorithm or could decrypt a number of input scan signals with a block algorithm. For example, there could be sixty-four input scan signals which each provide a bit for the block decryption.

The plain text input scan signals are loaded into their respective circuit blocks 204. In this embodiment, there is one scan signal per circuit block 204. After normal operation with an active CAPTURE signal, clocking of the circuit blocks 204 continues such that the multiple scan chains are shifted out in serial fashion. The second switch bank 208 can selectively manipulate the different output scan signals. For example, four output scan signals could be wholly or partially encrypted while the remainder stay in the clear. The encryption circuit 212 can use either a serial or block algorithm.

The embodiment 112-3 of FIG. 2C is similar to that of FIG. 2B except none of the input scan signals are decrypted. In FIG. 2D, another embodiment 112-4 is shown that encrypts all output scan signals. FIG. 2E shows an embodiment 112-5 that encrypts some output scan signals while others remain in the clear. In other words, a single output scan signal cannot be selectively encrypted. In the embodiment 112-6 of FIG. 2F, some whole input scan signals are decrypted while others are not. Also, some whole output scan signals are encrypted or hashed while others are not. A particular chain may have any permutation of encryption, decryption and/or hashing.

Figure 2H:
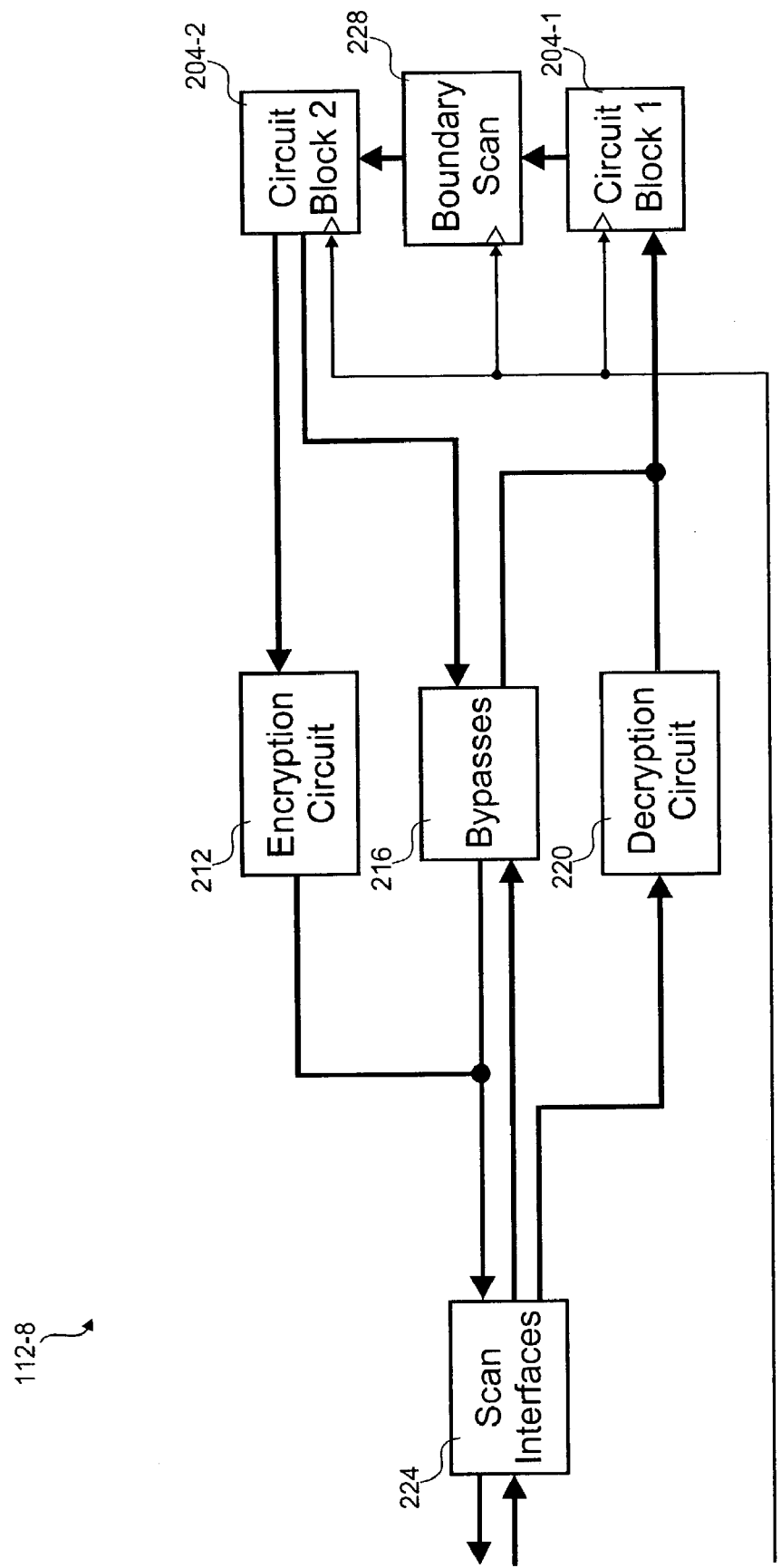

The embodiments 112-7, 112-8 of FIGS. 2G and 2H relate to embodiments that have multiple ICs. These ICs could be in the same package or in different packages on the same or a different circuit board. In FIG. 2G, three circuit blocks in different ICs 204 have their scan chains connected in a serial fashion. Decryption and encryption circuits 220, 212 could be in separate ICs, the same IC or integrated into the same IC as one of the circuit blocks 204. This embodiment 112-7 has bypass 216 for whole scan signals, but other embodiments could have partial scan signal bypass options.

Referring to FIG. 2H, this embodiment 112-8 tests both internal and boundary scan. The internal scan of the first circuit 204-1 is connected to the boundary scan chain 228 and the second circuit 204-2. In this way, boundary scan chains could be encrypted also. Some embodiments could test the boundary scan interface with possible cryptography without also linking through internal scan chains. Further, boundary scan chains for multiple chip packages, circuit cards and modules could be daisy-chained together in any combination to test those circuit assemblies.

Figure 3A:
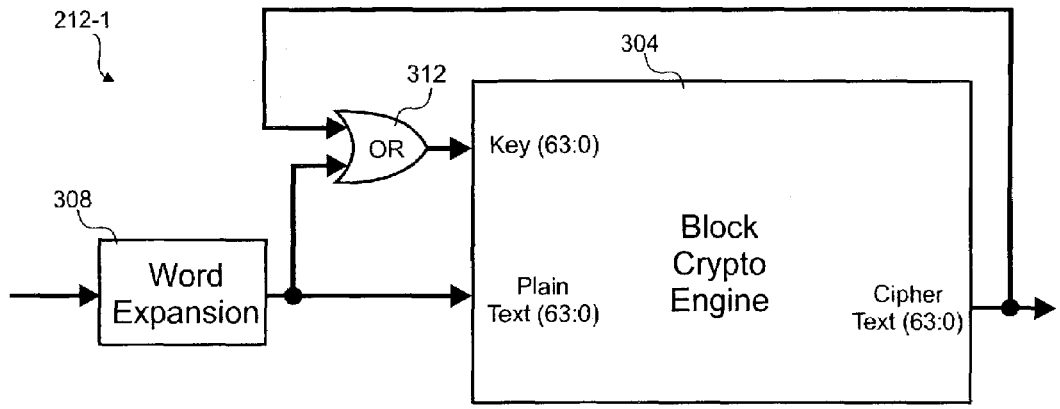
FIGS. 3A-C are block diagrams that each show an embodiment of an encryption circuit.

Referring next to FIG. 3A, a block diagram of an embodiment of an encryption circuit 212-1 is shown. This embodiment of the encryption circuit 212-1 performs block encryption. A word expansion block 308 takes the output scan signals and replicates some to achieve a block that has the word size of a block crypto engine. For example, where sixty-four bit blocks are encrypted by the block crypto engine 304 and only thirty-two output scan signals are input to the word expansion block 308, each output scan signal would be replicated to achieve sixty-four bit blocks for encryption.

The bits of the output scan signals could be expanded in any fashion. For example, some bits could be replicated twice, some could not be replicated at all and some could be replicated four times to achieve input into each bit of the block. The bit positions that the replicated signals were assigned to could be manipulated. The expansion process could be programmable such that different test scenarios could be expanded in different ways. Each bit input to the word expansion block 308 could be assigned to one or more output bit positions in a customizable way. Input test vectors 116 could be used to configure the word expansion block.

Some embodiments may have a set algorithm for expansion based upon the active input bits that does not require configuration. Arithmetic functions could be performed on the input bits also, for example, an expanded output bit is the exclusive-OR of one or more input bits. Some embodiments could determine when an output scan signal is bypassing the encryption circuit 212-1 and expand another bit in its place. Although this embodiment uses bit replication or algorithmic bit replication, other embodiments could simply use bit stuffing to achieve a block of the proper size.

The block crypto engine 304 is resident in the DUT 112. The crypto engine 304 could also be capable of decryption and could use word expansion during decryption. Various crypto algorithms could be used by the block crypto engine that are either private or public key, for example, RSA, DES, triple DES, AES, etc. This embodiment receives its seed key from the expanded output scan chains. Beyond the first encryption, the output cipher text is used to influence the key by use of the OR-gate 312 in a form of CBC chaining. Although this embodiment uses a block encryption circuit 212-1, others could use a serial encryption circuit. When encrypting the output test signal, a hash function could be used instead.

The block crypto engine 304 could use a one-way function or hash when processing the output scan signals. The actual values of the scan chain registers and F/Fs is often not necessary in production testing, but verifying a hash output would verify proper operation in most circumstances. Although the present embodiment produces a output scan signal for each test vector cycle, the CBC chaining requires only periodic checking of the output test vectors 120 as an error in one test would influence the encryption process for all future output as the cipher text output is fed back as the key input.

Figure 3B:
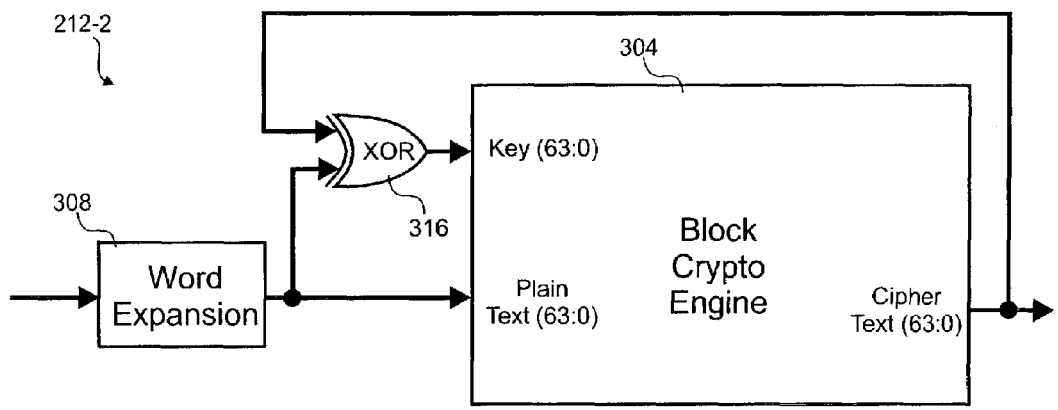

With reference to FIG. 3B, a block diagram of another embodiment of an encryption circuit 212-2 is shown. This embodiment uses an exclusive OR or XOR gate 316 for the CBC chaining. Other embodiments could use any logic gate that combines components from the plain text input to and cipher text output of the block crypto engine 316.

Figure 3C:
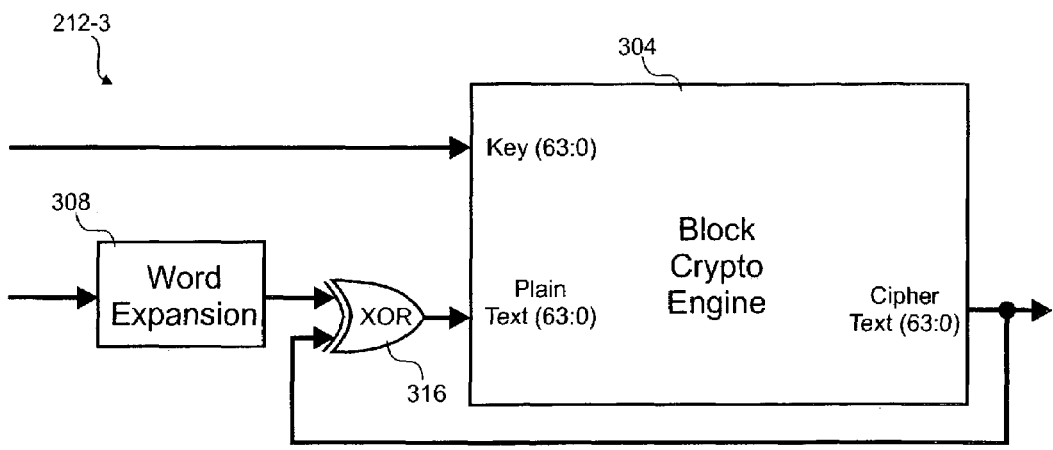

Referring next to FIG. 3C, a block diagram of yet another embodiment of an encryption circuit 212-3 is shown. This embodiment does not use CBC chaining on the key input, but does use CBC chaining for the plain text input. An XOR gate 316 is used to combine elements from the cipher text output and plain text input for the encryption process. The key input to the block crypto engine 304 could be a preset key in this embodiment, a series of preset keys, a key loaded from the test vectors, or a key generated elsewhere in the DUT 112. Some embodiments could use a predetermined key for the first cryptographic operation and then use some combination of plain/cipher text.

Figure 4:
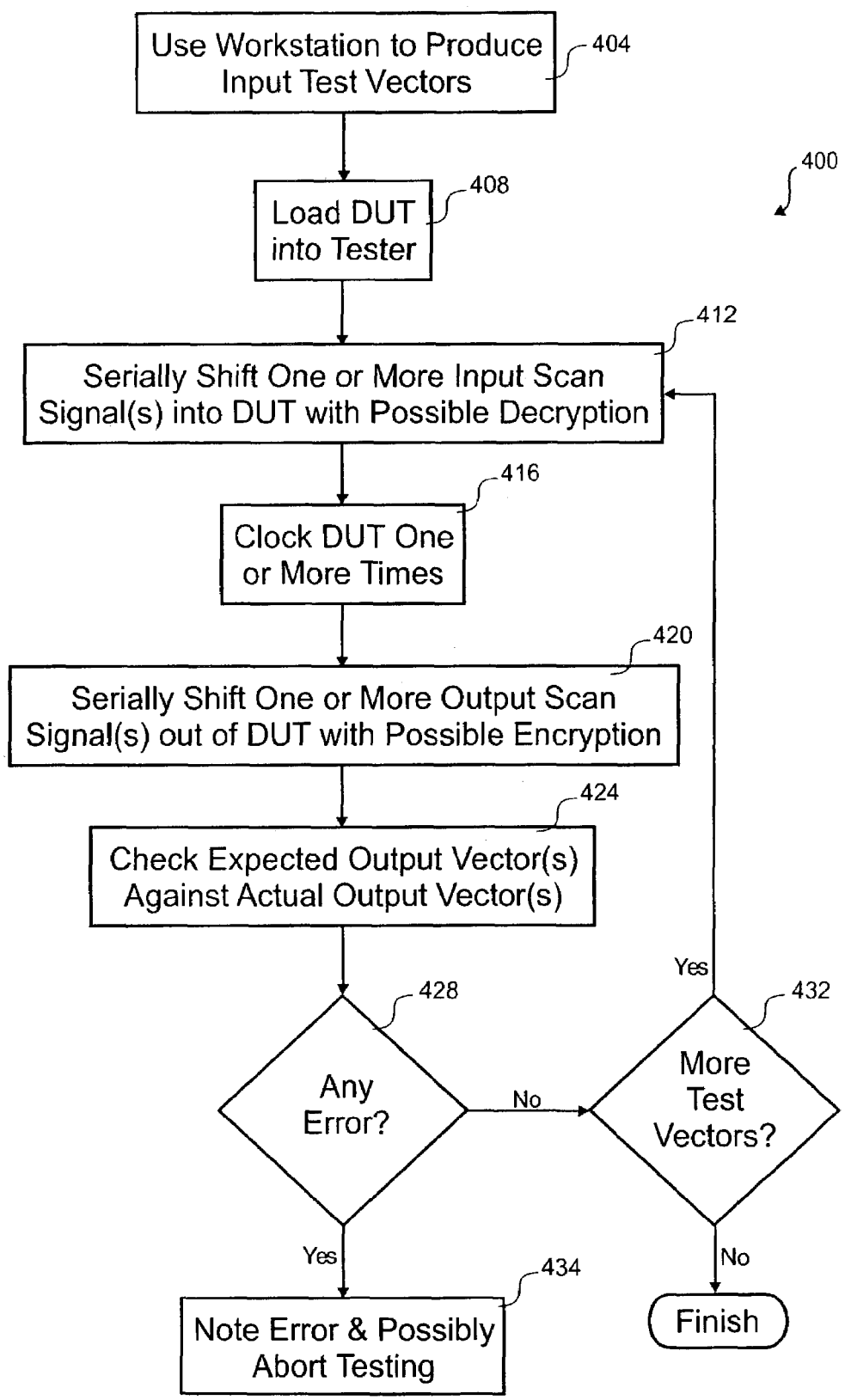
FIG. 4 is a flow diagram of an embodiment of a process for testing the DUT.

With reference to FIG. 4, a flow diagram of an embodiment of a process 400 for testing the DUT 112 is shown. The depicted portion of the process 400 begins in step 404 where the design workstation 104 is used to produce the input test vectors 116 and expected test vectors 124. An ATPG tool with a logical model of the DUT could be used for this purpose. The test vectors 116, 124 are provided to the circuit tester along with configuration information for the test protocol. In step 408, the DUT 112 is loaded into the circuit tester 108. Automated mechanisms could be used to quickly load and unload one or more DUTs 112.

The input test vectors 116 are read by the circuit tester 108 and applied to the input pins of the DUT 112 according to the test protocol. This loads the one or more input scan signals into their scan chains in step 412. The first switch 208-1 is manipulated to achieve partial or whole decryption for each input scan signal. Once all the registers and F/F for a circuit block 204 are loaded. Normal operation of the circuit block 204 is activated in step 416 by activating the CAPTURE signal that stops the serial shifting and begins normal operation on the next clock pulse. After deactivating the CAPTURE signal, the scan chains are shifted out in step 420 with manipulation of the second switch 208-8 for partial or whole encryption of the output scan chains.

In step 424, the expected output vectors 124 are tested against the actual output vectors 120 to confirm proper operation of the DUT 112. If errors are determined in step 428, the error is noted in step 434 and the testing could be aborted as defined by the test protocol. Where there is no error in step 428, a second determination is made by the tester 108. If there are more input test vectors 116, processing loops back to step 412. Where there no more input test vectors 116, this portion of the testing for the DUT 112 is complete.

Figure 5:
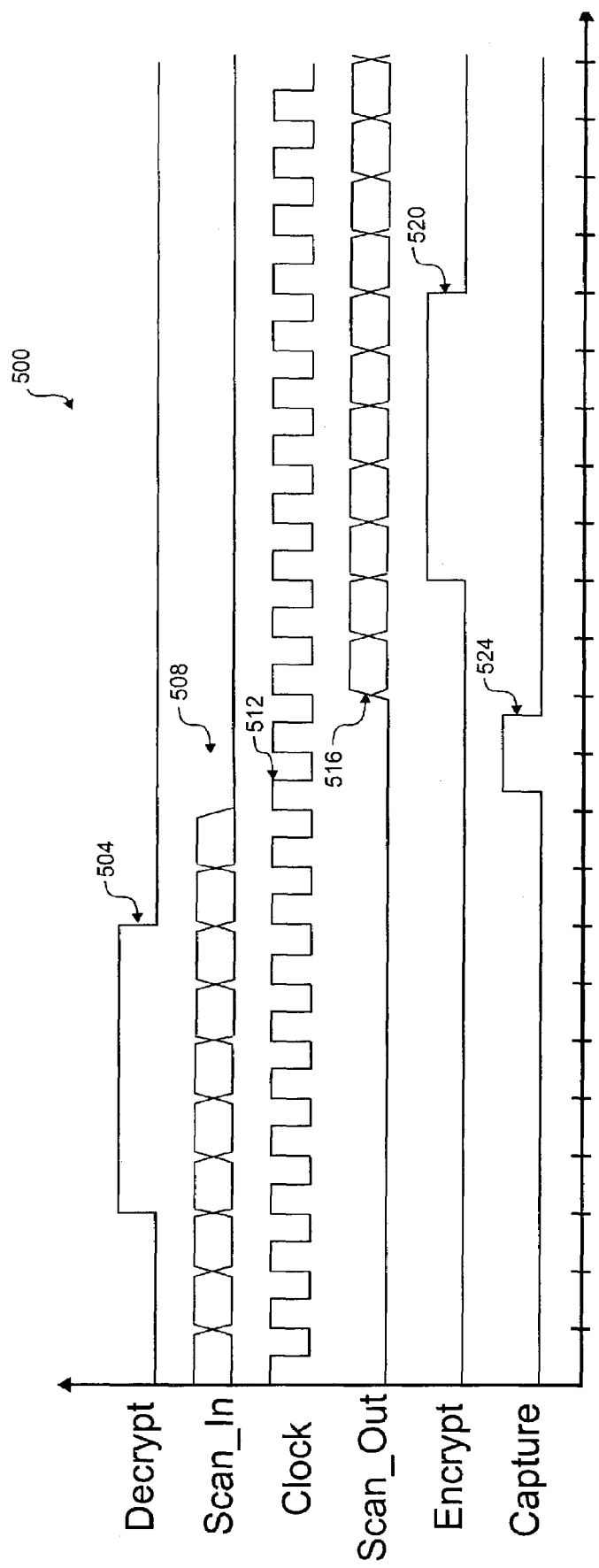
FIG. 5 is a timing chart of an embodiment of a test scenario.

Referring next to FIG. 5, a timing chart 500 of an embodiment of a test scenario is shown. In this embodiment, the first and second switches 208 have a single input to encrypt all scan signals when activated. A SCAN_IN signal 508 loads the input scan signals and a SCAN_OUT signal 516 reads out the output scan signals as depicted with a series of words in the chart 500. A CLOCK signal 512 is used to sample the SCAN_IN signal 508 and SCAN_OUT signal 516 as well as clock the DUT when operating in normal mode. The CAPTURE signal manipulates the CLOCK signal input to the memory registers to switch the DUT between serial scan chain shift mode and normal mode. More specifically, normal operation is enabled when the CAPTURE signal is active and scan shift operation is enabled when the CAPTURE signal is inactive. The DECRYPT signal 504 activates/deactivates decryption of all input scan signals. Similarly, the ENCRYPT signal 520 activates/deactivates encryption of all output scan signals.

A number of variations and modifications of the invention can also be used. For example, some embodiments could use asynchronous or self-timed circuitry in the DUT. Asynchronous or self-timed circuits perform some or all operations without a clock to pipeline every stage in the process. Input and/or output test signals for the asynchronous circuits would exist wholly or in-part in a cipher text form outside the DUT. Any method that is used for testing, the test data outside the asynchronous DUT can be encrypted.

While the principles of the invention have been described above in connection with specific apparatuses and methods, it is to be clearly understood that this description is made only by way of example and not as limitation on the scope of the invention.

What is claimed is:

1. A circuit that is capable of automated scan testing, the circuit comprising:
   a cryptographic engine capable of performing at least one of encryption and decryption of one or more scan signals;
   a switched bypass circuit for bypassing the cryptographic engine to selectively hash switched portions of the one or more scan signals;
   a digital circuit comprising combinatorial logic and a plurality of memory cells,
   wherein the plurality of memory cells have scan inputs connected serially in a scan chain; an input pin coupled to the scan chain; and
   an output pin coupled to the scan chain,
   wherein: at least one of the input pin and the output pin carries at least some cipher text data of the scan chain.

2. The circuit that is capable of automated scan testing as recited in claim 1, wherein the cryptographic engine encrypts at least some plain text data from the scan chain to produce the cipher text data for the output pin.

3. The circuit that is capable of automated scan testing as recited in claim 1, wherein the cryptographic engine decrypts at least some of the cipher text data from the input pin to produce plain text data for the scan chain.

4. The circuit that is capable of automated scan testing as recited in claim 1, wherein the cryptographic engine hashes at least some plain text data from the scan chain to produce the cipher text data for the output pin.

5. The circuit that is capable of automated scan testing as recited in claim 1, wherein the cryptographic engine uses public or private key algorithms.

6. The circuit that is capable of automated scan testing as recited in claim 1, wherein the cryptographic engine processes either serially or in blocks.

7. The circuit that is capable of automated scan testing as recited in claim 1, wherein a signal for the scan chain is coupled to a plurality of input bits of the cryptographic engine that processes in blocks.

8. The circuit that is capable of automated scan testing as recited in claim 1, wherein a seed for the cryptographic engine is related to data of the scan chain.

9. The circuit that is capable of automated scan testing as recited in claim 1, further comprising: a plurality of input pins coupled to a plurality of scan chains; and a plurality of output pins coupled to the plurality of scan chains.

10. The circuit that is capable of automated scan testing as recited in claim 9, wherein a subset of the plurality of input pins are coupled to the cryptographic engine.

11. The circuit that is capable of automated scan testing as recited in claim 9, wherein a subset of the plurality of output pins are coupled to the cryptographic engine.

12. A device under test (DUT) capable of automated testing, comprising:

a cryptographic engine that performs at least one of encryption and decryption of test information of a scan signal;

a switched bypass circuit for bypassing the cryptographic engine to selectively hash switched portions of the test information;

a digital circuit that includes test circuitry;

a first signal coupled with the DUT;

a second signal coupled with the DUT, wherein: the test information is, at least partially, encrypted outside the DUT, and at least one of the first and second signal carries the test information.

13. The DUT capable of automated testing as recited in claim 12, wherein the test circuitry includes at least one of an internal scan chain and a boundary scan chain.

14. The DUT capable of automated testing as recited in claim 12, wherein the test information is scan chain data.

15. The DUT capable of automated testing as recited in claim 12, wherein the digital circuit includes an asynchronous sub-circuit.

16. A method for processing protected test data of a scan signal to a digital circuit, the method comprising steps of:

accepting first test information of the scan signal to the digital circuit;

processing the first test information within the digital circuit, whereby the processing step tests the digital circuit;

producing second test information related to the first test information, further comprising at least one these steps:

decrypting test information, encrypting test information, and hashing test information; and wherein at least one of the first and second test information is selectively in cryptographic form upon entry or exit of the digital circuit, and wherein a switched bypass selectively hashes switched portions of the respective one of the at least one of the first and second test information.

17. The method for processing protected test data of the digital circuit as recited in claim 16, wherein the first and second test information is coupled to a scan chain for testing the digital circuit.

18. The method for processing protected test data of the digital circuit as recited in claim 16, further comprising a step of selecting a portion of the first test information to decrypt.

19. The method for processing protected test data of the digital circuit as recited in claim 16, further comprising a step of selecting a portion of the second test information to encrypt.

20. The method for processing protected test data of the digital circuit as recited in claim 16, further comprising a step of selecting a portion of the second test information to hash.

21. A computer-readable medium having computer-executable instructions for performing the computer-implementable method for processing protected test data of a digital circuit of claim 16.

22. A computer system adapted to perform the computer-implementable method for processing protected test data of a digital circuit of claim 16.

* * * * *